(12) United States Patent
Petro et al.

(10) Patent No.: US 7,576,468 B2
(45) Date of Patent: Aug. 18, 2009

(54) COMMUTATION OF BRUSHLESS ELECTRODYNAMIC MACHINES

(75) Inventors: John Patrick Petro, Los Altos, CA (US); Ken George Wasson, Foster City, CA (US); Lawrence Edward Miller, Burlingame, CA (US)

(73) Assignee: Novartorque, Inc., North Highlands, CA (US)

( * ) Notice: Subject to any disclaimer, the term of this patent is extended or adjusted under 35 U.S.C. 154(b) by 401 days.

(21) Appl. No.: 11/538,781

(22) Filed: Oct. 4, 2006

(65) Prior Publication Data

US 2007/0085442 A1 Apr. 19, 2007

Related U.S. Application Data

(60) Provisional application No. 60/724,055, filed on Oct. 5, 2005, provisional application No. 60/724,053, filed on Oct. 5, 2005, provisional application No. 60/724,062, filed on Oct. 5, 2005.

(51) Int. Cl.
H02K 1/12 (2006.01)
(52) U.S. Cl. .................................. 310/254; 310/156.38
(58) Field of Classification Search ................. 310/254, 310/233, 156.38, 136
See application file for complete search history.

(56) References Cited

U.S. PATENT DOCUMENTS

| 3,937,993 | A | 2/1976 | Noodleman |
| 3,991,331 | A | 11/1976 | Noodleman |
| 6,396,175 | B2 | 5/2002 | Fujita et al. |
| 6,724,121 | B2 | 4/2004 | Ettridge |
| 7,239,058 | B2 * | 7/2007 | Petro et al. ............. 310/156.34 |
| 7,294,948 | B2 * | 11/2007 | Wasson et al. ......... 310/156.38 |
| 2007/0126303 | A1 * | 6/2007 | Petro et al. ............. 310/156.38 |
| 2007/0296294 | A1 * | 12/2007 | Nobe et al. ................... 310/90 |

* cited by examiner

*Primary Examiner*—Hae Moon Hyeon
(74) *Attorney, Agent, or Firm*—Cooley Godward Kronish LLP

(57) ABSTRACT

A method, apparatus and system for selectably directing power signals to coils of active field pole members in brushless electrodynamic machinery are disclosed. In one embodiment, a field pole commutator includes a power transfer region configured to transfer at least a first power signal and second power signal to the coils. It also includes a first power region and a second power region configured to provide the first power signal and the second power signal, respectively, to the power transfer region. The first power region and the second power region each are configured to rotate together with the power transfer region about an axis of rotation. In one embodiment, the field pole commutator is implemented in a brushless direct current ("DC") current motor, which includes a rotor having permanent magnets and a plurality of active field pole members. Each active field pole member has one or more coils wound about the periphery of field pole members to form said plurality of active field pole members. In a specific embodiment, permanent magnets of the rotor include either conical magnets or cylindrical magnets, or both.

13 Claims, 15 Drawing Sheets

COMMUTATION OF BRUSHLESS ELECTRODYNAMIC MACHINES

CROSS REFERENCE TO RELATED APPLICATIONS

This application claims the benefit of U.S. Provisional Application Ser. No. 60/724,055, entitled "Commutation of Brushless Electrodynamic Machines," filed Oct. 5, 2005, the contents of which are hereby incorporated by reference in their entirety.

This application incorporates by reference the following documents in their entirety for all purposes: (1) U.S. Pat. No. 7,061,152, entitled "Rotor-Stator Structure for Electrodynamic Machines"; (2) U.S. Provisional Application No. 60/724,053, entitled "Motor Module for Linear and Rotary Motors," filed on Oct. 5, 2005; and (3) U.S. Provisional Application No. 60/724,062, entitled "Integrated Stator-Housing Structure for Constructing Electrodynamic Machines", filed Oct. 5, 2005;

BRIEF DESCRIPTION OF THE INVENTION

This invention relates generally to electrodynamic machines and the like, and more particularly, to a field pole commutator for a rotator-stator structure of a direct current ("DC") brushless motor, for example.

BACKGROUND OF THE INVENTION

Traditional motor structures, such as those driven by direct current ("DC") currents, are classified as either brushed or brushless motors. These two types of motor structures implement different commutation techniques and structures. Commutation refers to the action of selectably delivering power (e.g., described in terms of currents or voltages) to energize coils at proper motor phases to produce torque. Brushless motors operate by electronically commutating phase currents passing through stationary windings of a stator to magnetically interact with permanent magnets on a rotor. In brushless motors, an external electronic driver switches the application of currents to the stator windings. These currents then produce magnetic fields to generate torque on the permanent magnets. Brushed motors, however, use electromechanical components, or "brushes," to commutate the DC current in a winding (i.e., armature coil) on a rotor. The permanent magnets of a brushed DC motor remain stationary. The windings of the brushed motors are connected to different segments of a field pole commutator to make contact with brushes carrying the positive and negative voltages of the power supply. As the rotor rotates, different segments of the commutator come in contact with the brushes such that the coils are powered in a sequence, thereby perpetuating rotation of a shaft. FIGS. 1 and 2 depict the structural differences between brushless and brushed motors.

FIG. 1 illustrates a structure for a traditional brushless direct current ("DC") electric motor. Brushless DC electric motor 100 includes a first plate 108, a yoke 106 composed of laminations, a rotor assembly 104, and a second plate 102. Laminated yoke 106 supports coils (not shown) and also provides a mounting surface for joining first plate 108 with second plate 102. At least one drawback to brushless DC electric motor 100 is that laminated yoke 106 generally forms suboptimal flux paths. Another drawback is that the external electronic driver (i.e., controller) that controls commutation for brushless DC electric motor 100 is relatively more complicated and thus more expensive to implement than a commutator and a set of brushes used in brushed DC electric motors.

FIG. 2 illustrates a structure for a traditional brushed direct current ("DC") electric motor. Brushed DC electric motor 200 includes an end plate 202, a rotor assembly 204, and a housing 206. End plate 202 includes brushes 201 to make and break contact with commutation segments on commutator 203, thereby commutating power to a rotor assembly 204. It is rotor assembly 204 that includes one or more coils 207 in slots. Housing 206 is deep-drawn (i.e., it has been formed to have a deep housing cavity) and is configured to capture a first bearing (not shown) and one end of a shaft 205. Note that housing 206 can provide datum surfaces to locate and align end plate 202. End plate 202 is configured to capture a second bearing (not shown) and the other end of shaft 205. At least one drawback is that thermal energy, or heat, is generated by the one or more coils at a location that is relatively distant from the outside surface of the motor, thereby making it relatively difficult for heat to dissipate from the coils of rotor assembly 204. As such, the thermal resistance of brushless DC electric motor 100 is lower than that of brushed DC motor 200.

FIGS. 3A to 3D illustrate various aspects of traditional brushed DC electric motor 200 of FIG. 2. FIG. 3A shows a rotor assembly 300 for brushed DC electric motor 200 in which windings 207 are wound in slots (FIG. 2). Also shown is a commutator 203 and shaft 205. FIG. 3B illustrates stationary permanent magnets 304 being mounted to an inner diameter of housing 206. FIG. 3C depicts rotor assembly 300 of FIG. 3A residing in housing 206 of FIG. 3B. FIG. 3D shows brushes 306 contacting commutator 203. Brushes 306 can be of a different kind than brushes 201 of FIG. 2.

In view of the foregoing, it would be desirable to provide improved commutation techniques and structures that minimize at least one of the drawbacks in each of the conventional direct current (DC) electric motors.

SUMMARY OF THE INVENTION

A method, apparatus and system for selectably directing power signals to coils of active field pole members in brushless electrodynamic machinery are disclosed. In one embodiment, a field pole commutator includes a power transfer region configured to transfer at least a first power signal and second power signal to the coils. It also includes a first power region and a second power region configured to provide the first power signal and the second power signal, respectively, to the power transfer region. The first power region and the second power region each are configured to rotate together with the power transfer region about an axis of rotation. In one embodiment, the field pole commutator is implemented in a brushless direct current ("DC") current motor, which includes a rotor having permanent magnets and a plurality of active field pole members. Each active field pole member has one or more coils wound about the periphery of field pole members to form the plurality of active field pole members. In a specific embodiment, permanent magnets of the rotor include either conical magnets or cylindrical magnets, or both.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Definitions

Figure 1:
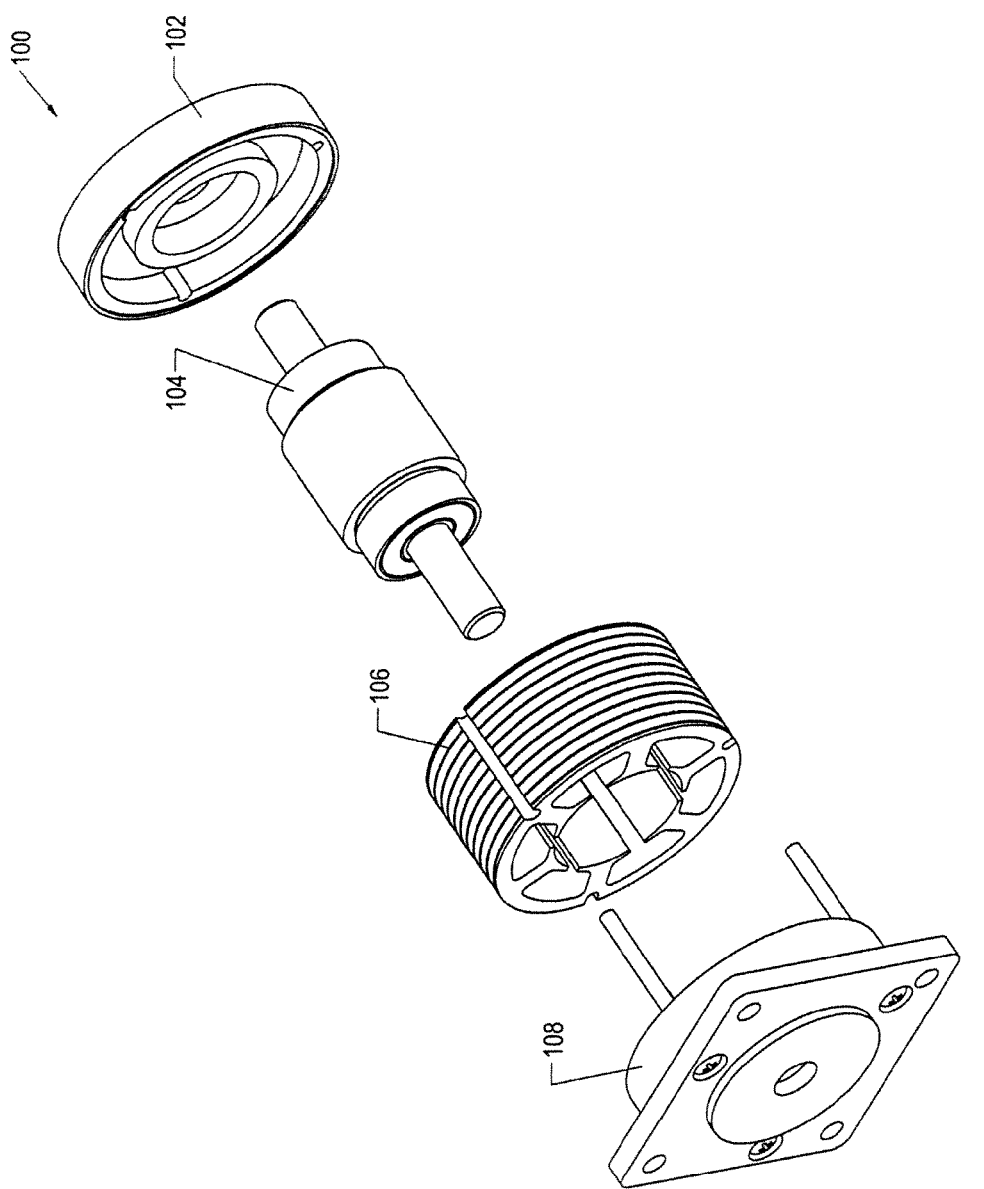
FIG. 1 illustrates a structure for a conventional brushless direct current ("DC") electric motor.
Figure 2:
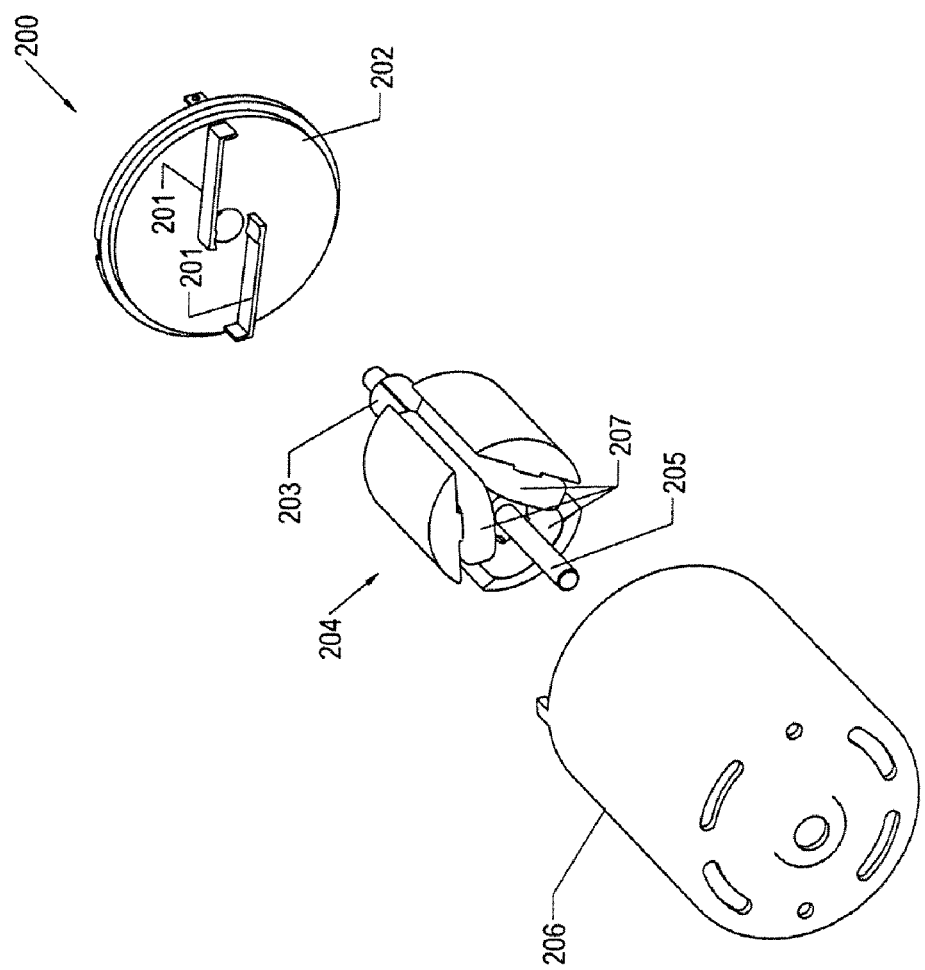
FIG. 2 illustrates a structure for a traditional brushed DC electric motor.
Figure 3A:
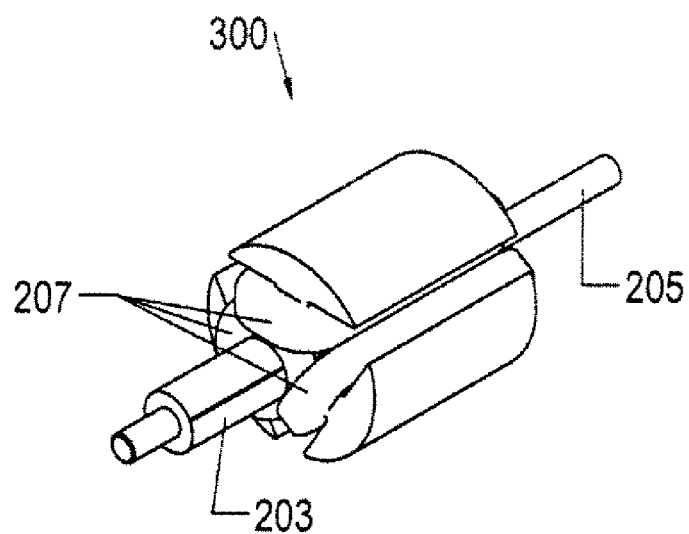
FIGS. 3A to 3D illustrate various aspects of the traditional brushed DC electric motor of FIG. 2.
Figure 3B:
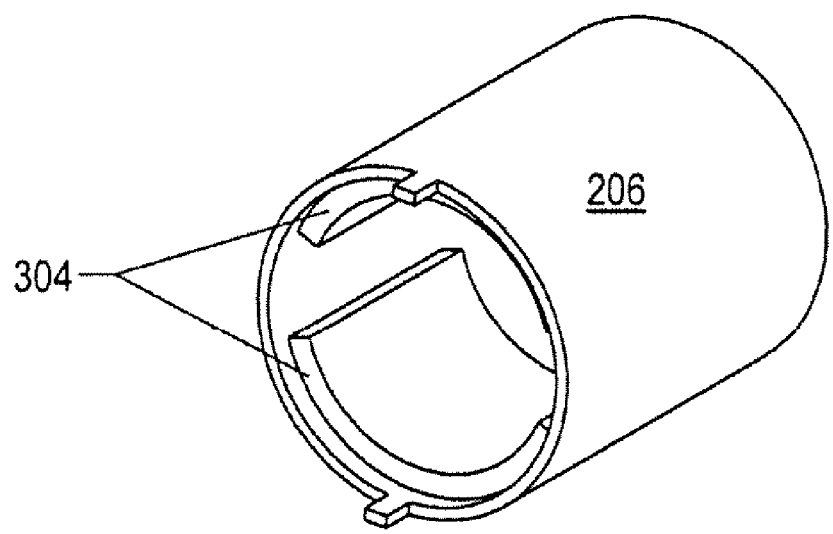
Figure 3C:
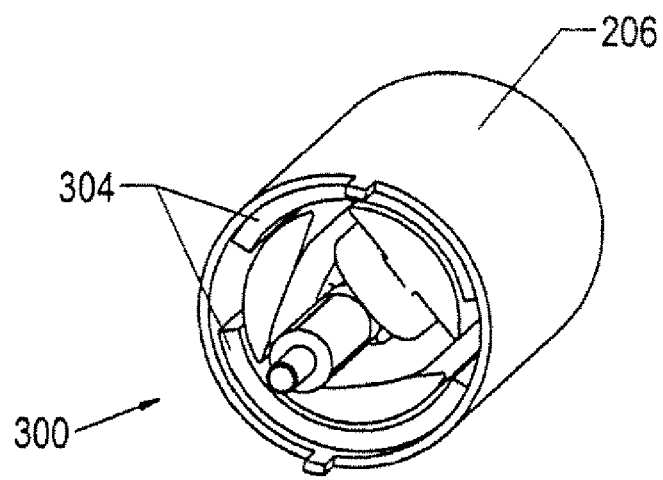
Figure 3D:
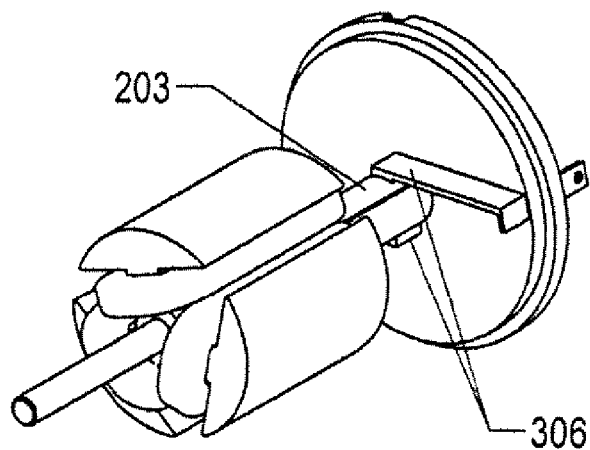

The following definitions apply to some of the elements described with respect to some embodiments of the invention. These definitions may likewise be expanded upon herein.

As used herein, the term "air gap" refers to a space, or a gap, between a magnet surface and a confronting pole face. Such a space can be physically described as a volume bounded at least by the areas of the magnet surface and the pole face. An air gap functions to enable relative rotation between a rotor and a stator, and to define a flux interaction region. Although an air gap is typically filled with air, it need not be so limiting.

As used herein, the term "back-iron" commonly describes a physical structure (as well as the materials giving rise to that physical structure) that is often used to complete an otherwise open magnetic circuit. In particular, back-iron structures are generally used only to transfer magnetic flux from one magnetic circuit element to another, such as either from one magnetically permeable field pole member to another, or from a magnet pole of a first magnet to a magnet pole of a second magnet, or both, without an intervening ampere-turn generating element, such as coil, between the field pole members or the magnet poles. Furthermore, back-iron structures are not generally formed to accept an associated ampere-turn generating element, such as one or more coils.

As used herein, the term "brushed motor" refers to a motor having a rotor-stator structure implementing the windings of a coil on the rotor with permanent magnets being affixed in a stationary position. A brushed motor uses mechanical means to control the motor, such as a commutator with brushes to commutate the direct current ("DC") current in the coil.

As used herein, the term "brushless motor" refers to a motor having a rotor-stator structure implementing the windings of coils generally in the stator with the permanent magnets being generally affixed to the rotor. A brushless motor uses an electronic controller to perform commutation for the current in the coil of an active field pole member.

As used herein, the term "coil" refers to an assemblage of successive convolutions of a conductor arranged to inductively couple to a magnetically permeable material to produce magnetic flux. In some embodiments, the term "coil" can be described as a "winding" or a "coil winding." The term "coil" also includes foil coils (i.e., planar-shaped conductors that are relatively flat).

As used herein, the term "coil region" refers generally to a portion of a field pole member around which a coil is wound.

As used herein, the term "core" refers to a portion of a field pole member where a coil is normally disposed between pole shoes and is generally composed of a magnetically permeable material for providing a part of a magnetic flux path.

As used herein, the term "field pole member" refers generally to an element composed of a magnetically permeable material and being configured to provide a structure around which a coil can be wound (i.e., the element is configured to receive a coil for purposes of generating magnetic flux). In particular, a field pole member includes a core (i.e., core region) and at least one pole shoe, each of which is generally located near a respective end of the core. Without more, a field pole member is not configured to generate ampere-turn flux. In some embodiments, the term "field pole member" can be described generally as a "stator-core."

As used herein, the term "active field pole member" refers to an assemblage of a core, one or more coils, and at least one pole shoe. In particular, an active field pole member can be described as a field pole member assembled with one or more coils for selectably generating ampere-turn flux. In some embodiments, the term "active field pole member" can be described generally as a "stator-core member."

As used herein, the term "ferromagnetic material" refers to a material that generally exhibits hysteresis phenomena and whose permeability is dependent on the magnetizing force. Also, the term "ferromagnetic material" can also refer to a magnetically permeable material whose relative permeability is greater than unity and depends upon the magnetizing force.

As used herein, the term "field interaction region" refers to a region where the magnetic flux developed from two or more sources interact vectorially in a manner that can produce mechanical force and/or torque relative to those sources. Generally, the term "flux interaction region" can be used interchangeably with the term "field interaction region." Examples of such sources include field pole members, active field pole members, and/or magnets, or portions thereof. Although a field interaction region is often referred to in rotating machinery parlance as an "air gap," a field interaction region is a broader term that describes a region in which magnetic flux from two or more sources interact vectorially to produce mechanical force and/or torque relative to those sources, and therefore is not limited to the definition of an air gap (i.e., not confined to a volume defined by the areas of the magnet surface and the pole face and planes extending from the peripheries between the two areas). For example, a field interaction region (or at least a portion thereof) can be located internal to a magnet.

As used herein, the term "generator" generally refers to an electrodynamic machine that is configured to convert mechanical energy into electrical energy regardless of, for example, its output voltage waveform. As an "alternator" can be defined similarly, the term generator includes alternators in its definition.

As used herein, the term "magnet" refers to a body that produces a magnetic field externally unto itself. As such, the term magnet includes permanent magnets, electromagnets, and the like.

As used herein, the term "motor" generally refers to an electrodynamic machine that is configured to convert electrical energy into mechanical energy.

As used herein, the term "magnetically permeable" is a descriptive term that generally refers to those materials having a magnetically definable relationship between flux density ("B") and applied magnetic field ("H"). Further, "magnetically permeable" is intended to be a broad term that includes, without limitation, ferromagnetic materials, powder metals, soft magnetic composites ("SMCs"), and the like.

As used herein, the term "pole face" refers to a surface of a pole shoe that faces at least a portion of the flux interaction region (as well as the air gap), thereby forming one boundary of the flux interaction region (as well as the air gap). In some embodiments, the term "pole face" can be described generally as a "stator surface" or at least a portion of a "flux interaction surface," or both.

As used herein, the term "pole shoe" refers to that portion of a field pole member that facilitates positioning a pole face so that it confronts a rotor (or a portion thereof), thereby serving to shape the air gap and control its reluctance. The pole shoes of a field pole member are generally located near each end of the core starting at or near a coil region and terminating at the pole face. In some embodiments, the term "pole shoe" can be described generally as a "stator region."

As used herein, the term "soft magnetic composites" ("SMCs") refers to those materials that are comprised, in part, of insulated magnetic particles, such as insulation-coated ferrous powder metal materials that can be molded to form an element of the stator structure of the present invention.

Discussion

Various embodiments of the invention provide for commutators and commutating techniques for an electrodynamic machine, such as a motor having a rotator-stator structure similar to direct current ("DC") brushless motors. In a specific embodiment, exemplary commutators and commutating techniques include an electromechanical field pole commutator for controlling the operation of motors having stationary field poles with windings, such as active field pole members, and permanent magnets on the rotor. As such, embodiments of the invention provide for the preferred operational characteristics of brushless and brushed motors. Namely, a brushless rotator-stator structure of the invention can provide favorable heat transfer properties since the coils can make thermal contact with a motor housing, thereby readily dissipating heat, unlike traditional brushed motors having coils that are thermally isolated on the rotor. Consequently, a motor implementing commutators and commutating techniques of the various embodiments can provide for relatively higher output torque and efficiency. In addition, the rotor can achieve relatively higher mechanical speeds in some embodiments by transferring the mass and volume of the coils from the rotor to the active field pole members. In particular, brushless rotator-stator structures of the various embodiments can generally provide for lower inertia and decreased surface area, as well as a smoother, more aerodynamic profile to reduce windage or drag. Advantageously, brushless rotator-stator structures (and the motors implementing such structures) of the various embodiments of the invention can dispense with the implementation of external electronic drivers, thereby reducing the complexity and costs normally associated with commutating tradition brushless motors.

Figure 4:
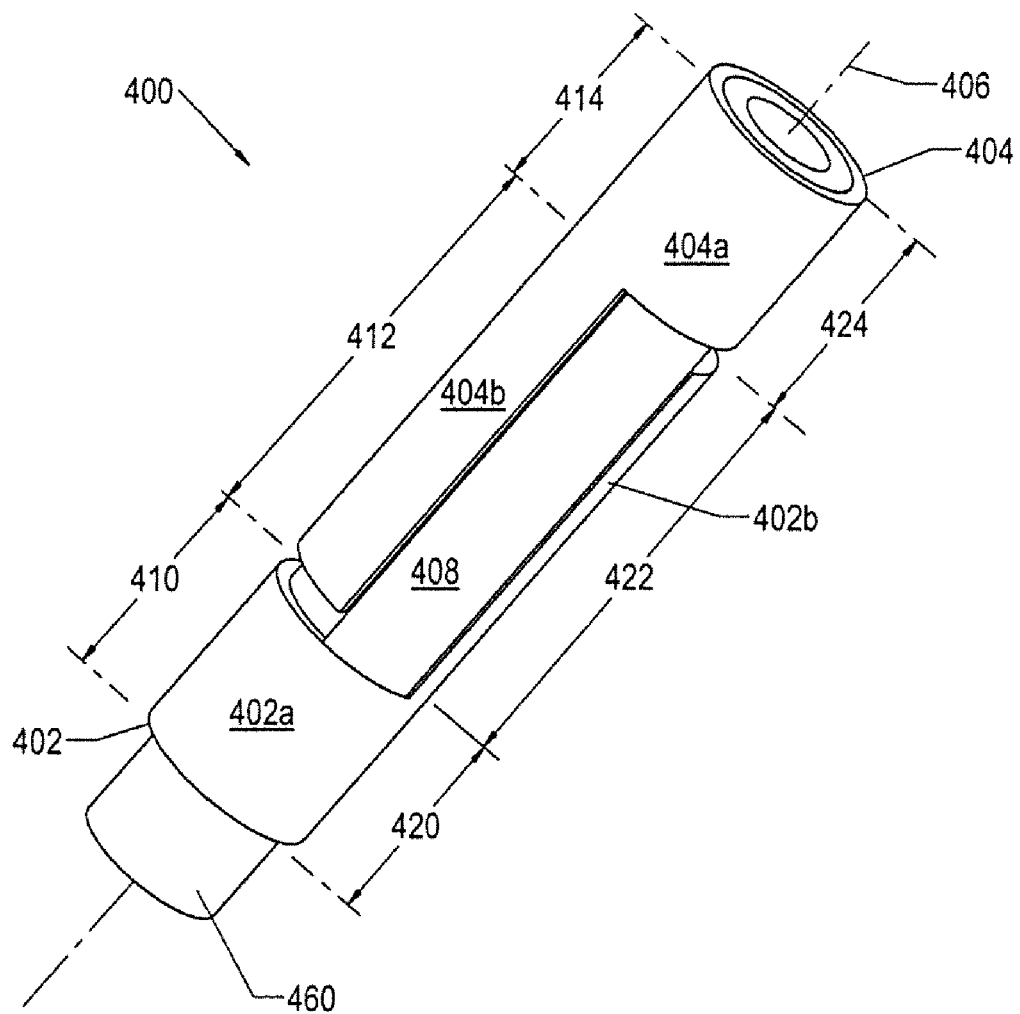
FIG. 4 illustrates an example of a field pole commutator for commutating brushless rotor-stator structures, according to one or more embodiments of the invention.

FIG. 4 illustrates an example of a field pole commutator for commutating brushless rotor-stator structures according to one or more embodiments of the invention. Field pole commutator 400 is configured to selectably direct power signals to coils of active field pole members (not shown). The term "power signal" is interchangeable with the terms "voltage signal" and "current signal." Field pole commutator 400 includes a power transfer region 412 configured to transfer power signals, such as a first power signal and second power signal, to the coils of active field pole members. Field pole commutator 400 also includes power regions, such as power region ("1") 410 and power region ("2") 414. In particular, power region 410 and power region 414 are configured to respectively receive the first power signal and the second power signal from external power sources (not shown). For example, the external power sources can include power supplies that generate positive voltages (e.g., as the first power signal) and negative voltages (e.g., as the second power signal). Then, power region 410 and power region 414 provide the first power signal and the second power signal, respectively, to power transfer region 412. Generally, power region 410 and power region 414 each are configured to rotate together with power transfer region 412 about an axis of rotation 406. In at least one embodiment, power regions 410 and 414 include conductively cylindrical surfaces for providing power signals continuously to power transfer region 412. As such, power signals can be applied to commutator 400 in a continuous manner. In a specific embodiment, field pole commutator 400 is configured to reside on a rotor of a brushless rotor-stator structure, with the stator including stationary active field pole members (i.e., stationary relative to a point in space, such as on a motor housing). One or more coils can be wound about the periphery of each field pole to form an active field pole member.

As shown, field pole commutator 400 is composed of a first field pole commutator member 402 and a second field pole commutator member 404. Specifically, first field pole commutator member 402 includes a first surface portion 402a having a circular cross-section in a plane perpendicular to the axis of rotation along a first axial length 420. It also includes a second surface portion 402b having an arc-shaped cross section in a plane perpendicular to the axis of rotation along a second axial length 422. Second field pole commutator member 404 includes a first surface portion 404a having a circular cross-section in a plane perpendicular to the axis of rotation along a third axial length 424. It also includes a second surface portion 404b having an arc-shaped cross section in a plane perpendicular to the axis of rotation along second axial length 422. Note that surfaces 402 and 404 are electrically isolated from each other. In one embodiment, first surface portion 402a constitutes first power region 410, first surface portion 404a constitutes second power region 414, and second surfaces 402b and 404b constitute power transfer region

412. Field pole commutator 400 also can include a non-conductive cylinder 460 having an inner diameter and an outer diameter, the inner diameter being configured to reside on a shaft (not shown) along axis of rotation 406 and the outer diameter being configured to contact an inner diameter of first surface portions 402a and 404a and second surface portions 402b and 404b.

Power transfer region 412 is configured to transfer power signals received from the external power sources via first surface portions 402a and 404a to coils of active field pole members. Each second surface portion 402b and 404b of power transfer region 412 covers a limited angle of rotation. This angle sets the timing of the excitation of the coils. Note that the widths or placement angle with respect to the position of the magnets on the rotor of this portion of the commutator can be varied to produce different drive characteristics. As shown, power transfer region 412 includes one or more non-conductive surfaces to provide a duration in which a winding of a coil is not energized by any power signal. In one embodiment, the temporal application of the first power signal and the second power signal to the coils is a function of the lengths of the arc-shaped cross sections of second surface portions 402b and 404b. The temporal application of the power signals can also depend on the rate at which the shaft rotates. In another embodiment, the temporal application of the first power signal and the second power signal to the coils is a function of the positioning about axis of rotation 406 of the arc-shaped cross sections. For example, a non-conductive surface 408 can influence the positioning of second surface portions 402b and 404b from each other along the circumference of the cylinder. In at least one embodiment, each of power transfer region 412, power region 410 and power region 414 rotate in synchronicity with a rotor (not shown) including either conical magnets or cylindrical magnets, or both.

Figure 5:
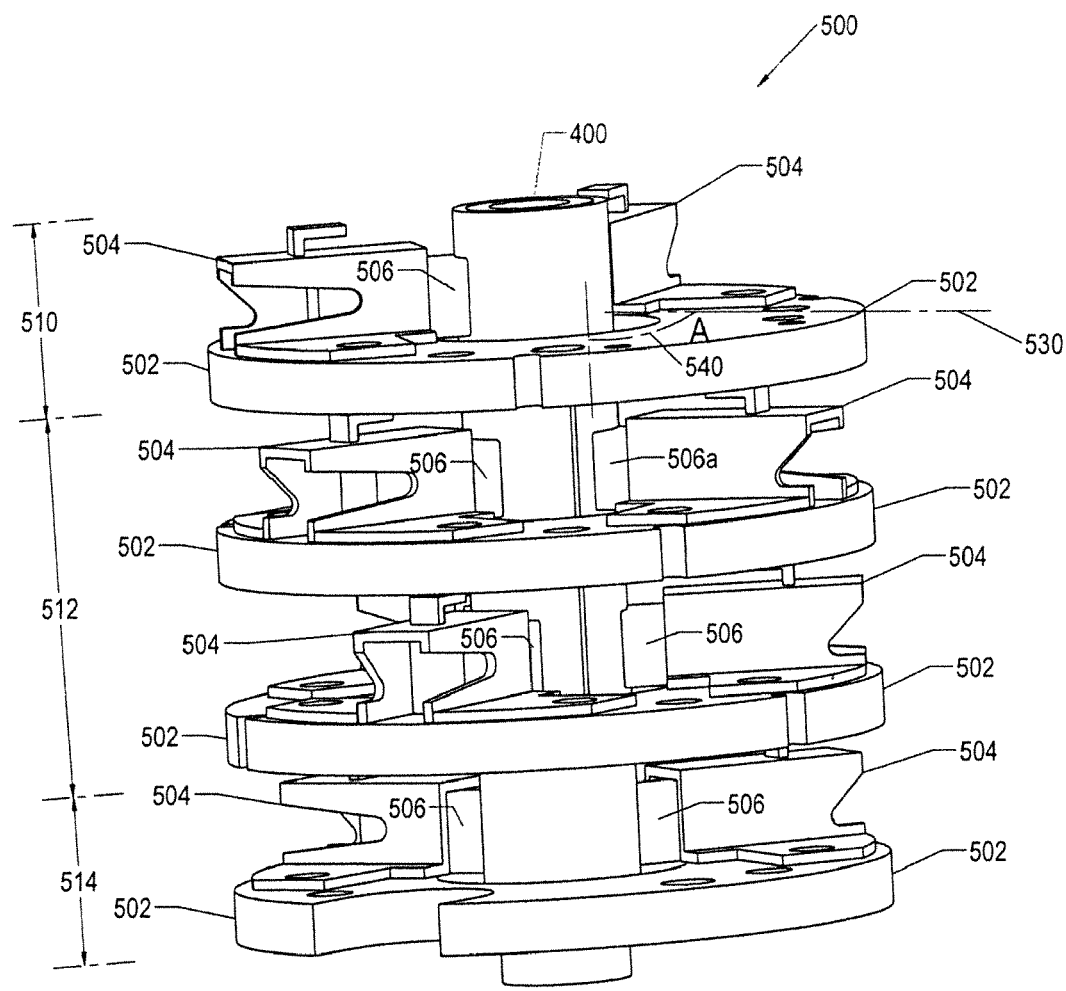
FIG. 5 illustrates an example of a field pole commutator including brushes, according to one or more embodiments of the invention.

FIG. 5 illustrates an example of a field pole commutator including brushes, according to one or more embodiments of the invention. Field pole commutator 500 includes field pole commutator 400 and brush holder supports 502, each of which are configured to be affixed in space such that they remain stationary with respect to the power transfer region, the first power region and the second power region. Field pole commutator 500 also includes brush holders 504 coupled to one or more of plurality of brush holder supports 502. It further includes brushes 506, each being mounted in an associated brush holder 504. In one embodiment, field pole commutator 500 includes a first set 510 of one or more brushes 506 configured to electrically engage a first power region and a second set 514 of one or more brushes 506 configured to electrically engage a second power region. Field pole commutator 500 also includes a number of other sets 512 of one or more brushes configured to electrically engage the power transfer region.

In a specific embodiment, each of the number of other sets 512 of one or more brushes 506 resides at different angular positions from a reference ray 530 extending radially in a plane perpendicular to the axis, thereby producing different times at which each of the sets of coils are excited. For example, angle ("A") 540 from ray 530 to brush 506a is the angle that serves to set the timing for exciting the associated coil relative to the other coils. With field pole commutator 500, first set 510 of brushes 506 and second set 514 of brushes 506 provide a positive direct current ("DC") current and a negative DC current, respectively, to the first power region and the second power region. Further to field pole commutator 500, consider a specific embodiment in which there are two sets of brushes within a number of other sets 512. These two brush sets provide power to sets of parallel windings and to provide, for example, a stepwise approximation of a sinusoid waveform. The use of two sets of coils and brushes is optional. In another embodiment, the number of other sets 512 can include one set of windings to reduce the number of brushes 506.

Figure 6:
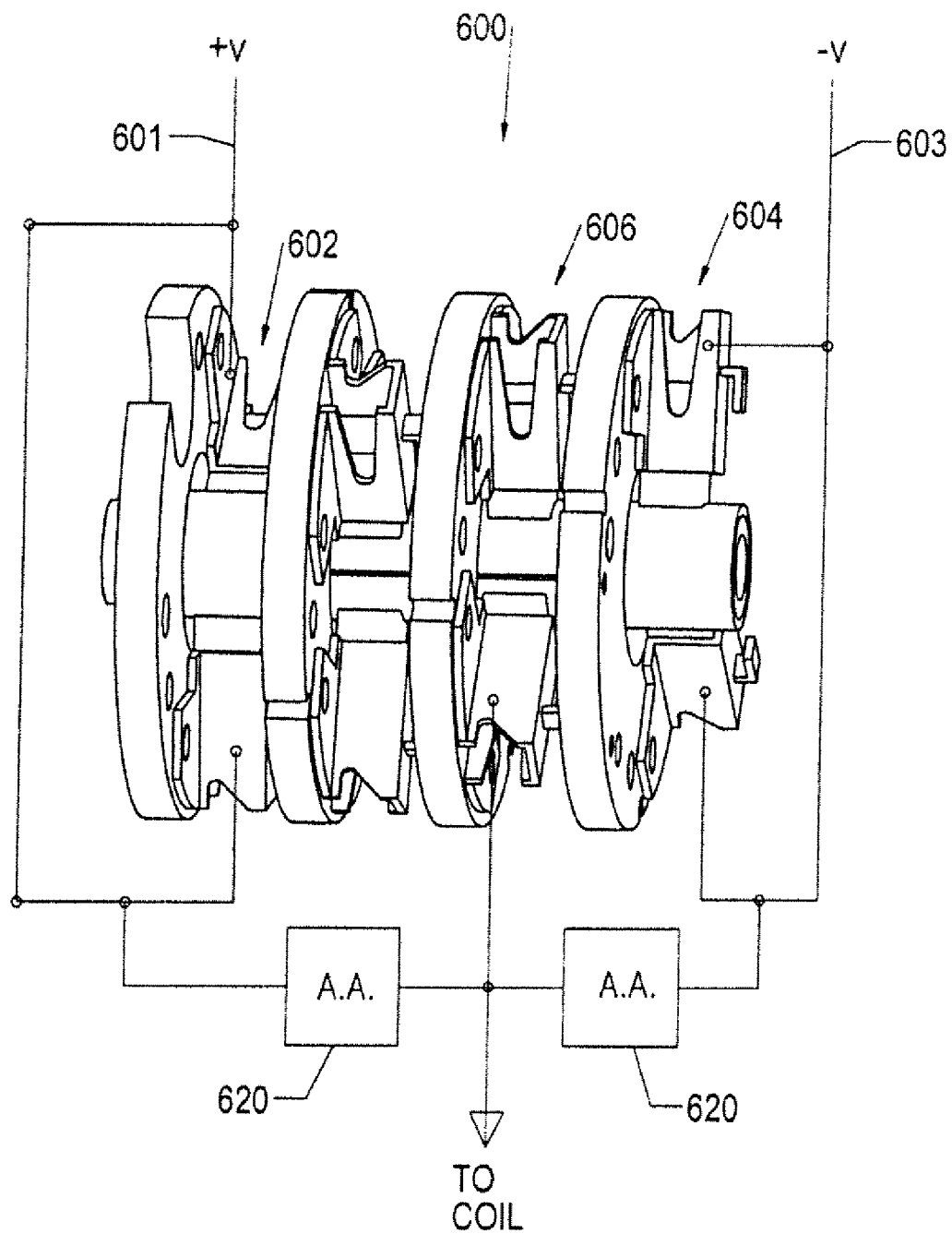
FIG. 6 illustrates implementation of arc-arrestors, according to one or more embodiments of the invention.

FIG. 6 illustrates implementation of arc-arrestors, according to one or more embodiments of the invention. Field pole commutator 600 includes a first set of brushes 602 coupled to an external positive power supply ("+V") 601 and a second set of brushes 604 coupled to an external negative power supply ("−V") 603. Advantageously, the stationary nature of coils in accordance with at least some embodiments of the invention provides an ability to reduce arcing by attaching arc-arrestors ("A.A.") 620 between each brush in brush set 606 and positive and negative power terminals. In one embodiment, arc-arrestors 620 are diodes (which are stationary). Without arc-arrestors 620, the inductance of the coils combined with the rapidly changing currents can cause relatively high voltages in the coils. In a traditional brushed motor, when a segment of the commutator begins to make contact with one of the brushes there is a large voltage difference between the brush and the segment of the commutator and arcing occurs. The same thing happens when contact is broken. But if arc-arrestors 620 are placed between brush set 606, which is coupled to a coil, and the power terminals (e.g., connected to external positive power 601 and negative power 603 supplies), the voltage differences can be limited and thus arcing can be prevented and/or reduced.

Figure 7:
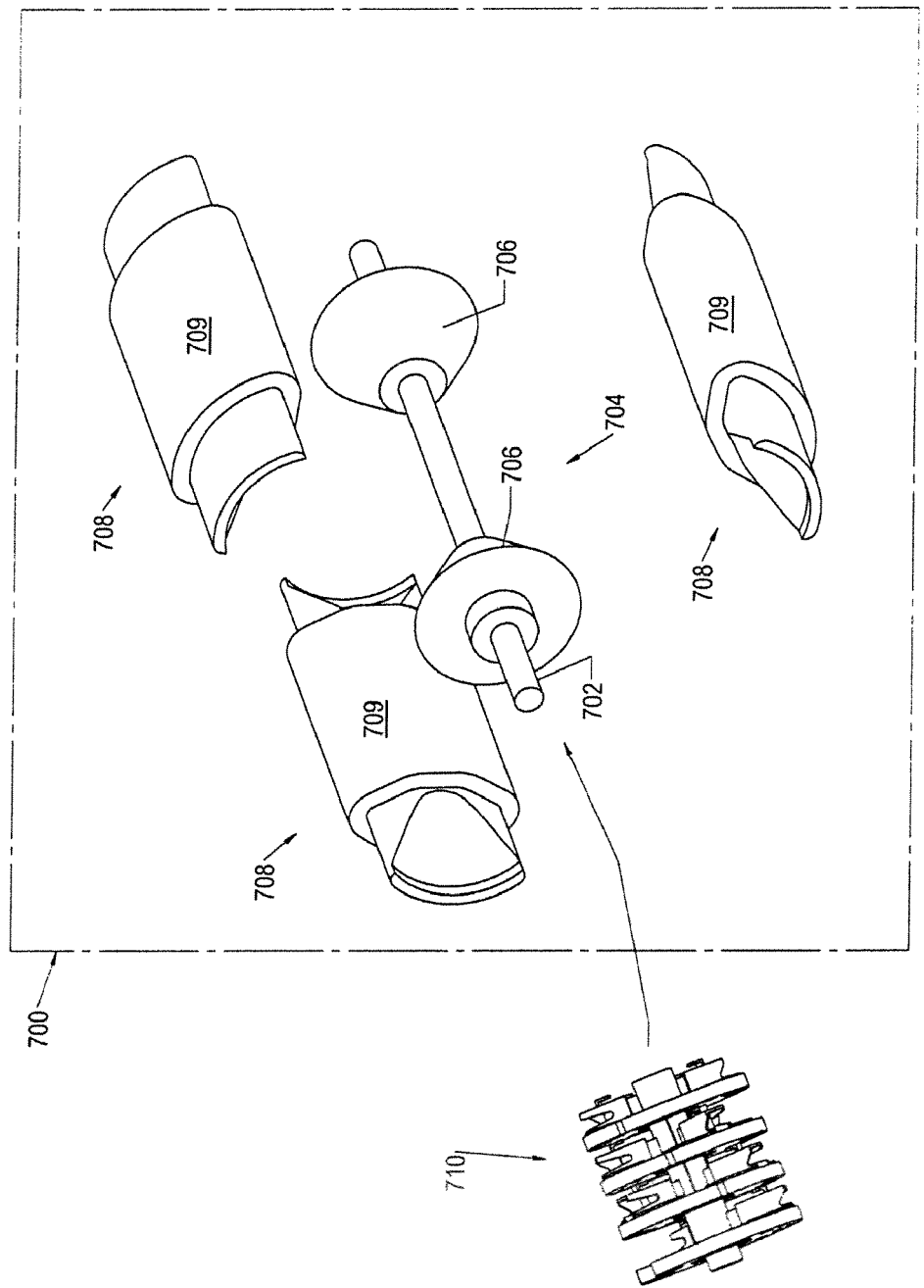
FIG. 7 depicts a brushless direct current ("DC") current motor in accordance with one embodiment of the invention.

FIG. 7 depicts a brushless direct current ("DC") motor in accordance with one embodiment of the invention. Brushless rotor-stator structure 700 includes a shaft 702 on which the rotating part of the field pole commutator 710 is affixed. Brushless rotor-stator structure 700 includes a rotor 704 including permanent magnets 706. It also includes active field pole members 708 each having one or more coils 709 wound about the periphery of field pole members to form active field pole members 708. Note that active field pole members 708 can be arranged coaxially about an axis of rotation. The stationary portion of the field pole commutator 710 is suitably affixed to the stator and housing assembly. A suitable brushless rotor-stator structure 700 to practice this embodiment is described in U.S. Pat. No. 7,061,152.

Figure 8:
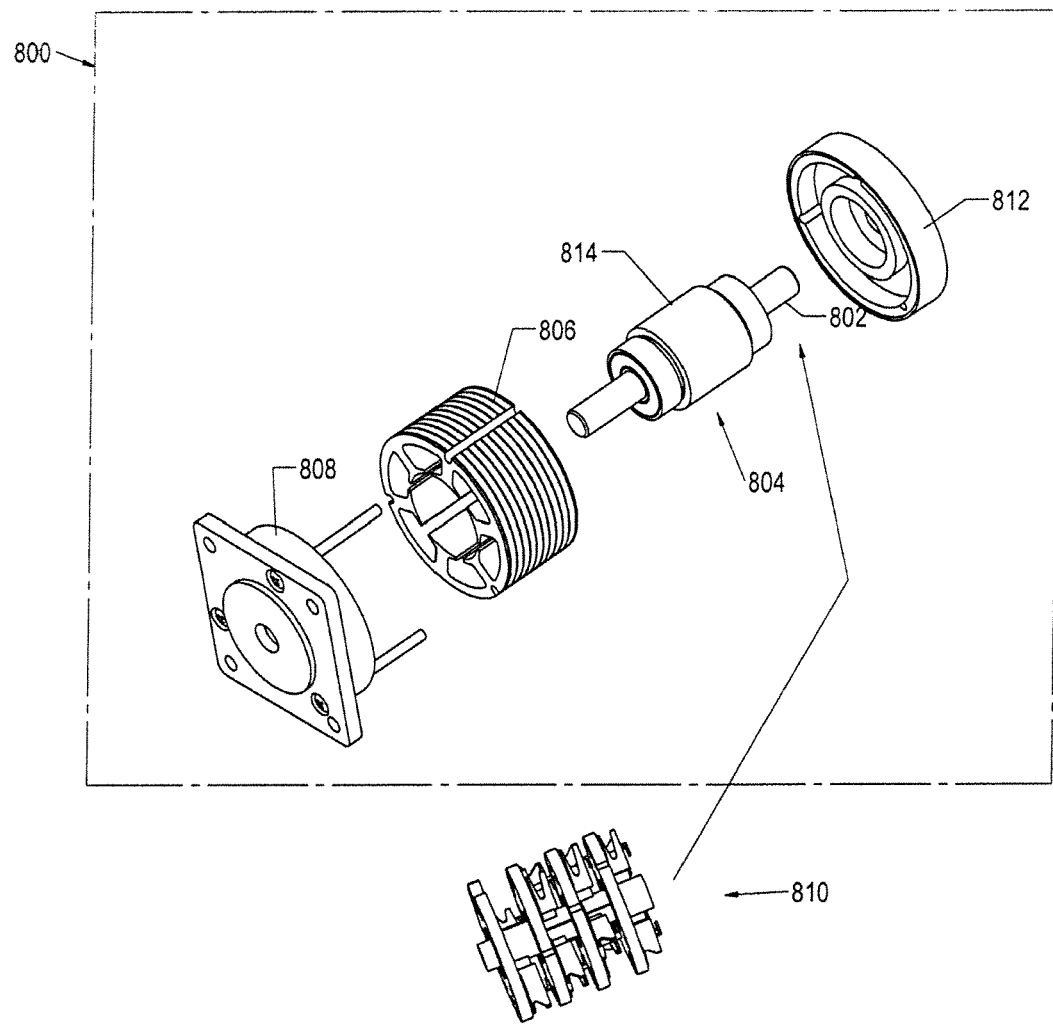
FIG. 8 depicts a brushless direct current ("DC") current motor in accordance with another embodiment of the invention.

FIG. 8 depicts a brushless direct current ("DC") current motor in accordance with another embodiment of the invention. Brushless rotor-stator structure 800 includes a shaft 802 on which the rotating portion of the field pole commutator 810 is affixed. Motor 800 includes a rotor 804 including permanent magnets 814. It also includes a laminated yoke 806 containing slots for one or more coils (not shown). The stationary portion of the field pole commutator 810 is suitably affixed to the yoke and end plate assembly. Plates 808 and 812 are used to hold motor 800 together.

Figure 9:
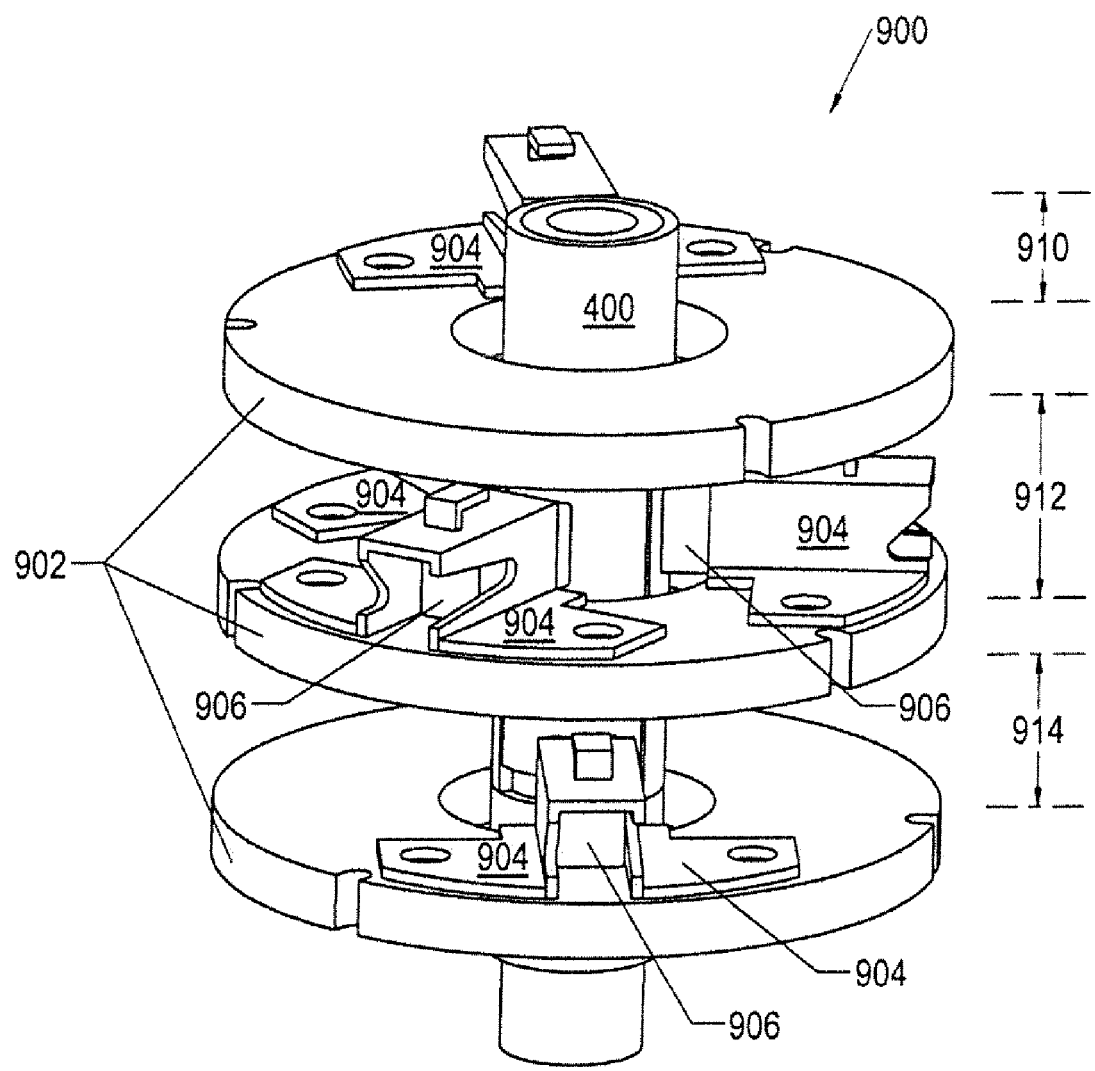
FIG. 9 depicts another example of a field pole commutator including brushes, according to one or more embodiments of the invention.

FIG. 9 depicts another example of a field pole commutator including brushes, according to one or more embodiments of the invention. Field pole commutator 900 includes field pole commutator 400 and brush holder supports 902, each of which are configured to be affixed in space such that they remain stationary with respect to the power transfer region, the first power region and the second power region. Field pole commutator 900 also includes brush holders 904 coupled to one or more of a plurality of brush holder supports 902. It further includes brushes 906, each being slideably mounted in an associated brush holder 904. In one embodiment, field pole commutator 900 includes a first set 910 of one or more brushes 906 configured to electrically engage a first power region and a second set 914 of one or more brushes 906 configured to electrically engage a second power region. Field pole commutator 900 also includes a set 912 of one or more brushes 906 configured to electrically engage the power transfer region.

In the example shown, first set 910 and second set 914 each include one brush 906, whereas set 912 includes three brushes 906. The three brushes 906 of set 912 are associated with the three individual coils (e.g., coils A, B and C in FIG. 10) which are wound in a "Y" configuration. Commutator 900 supplies current to the three coils via the three brushes 906 of set 912 as a function of a rotor angle.

Figure 10:
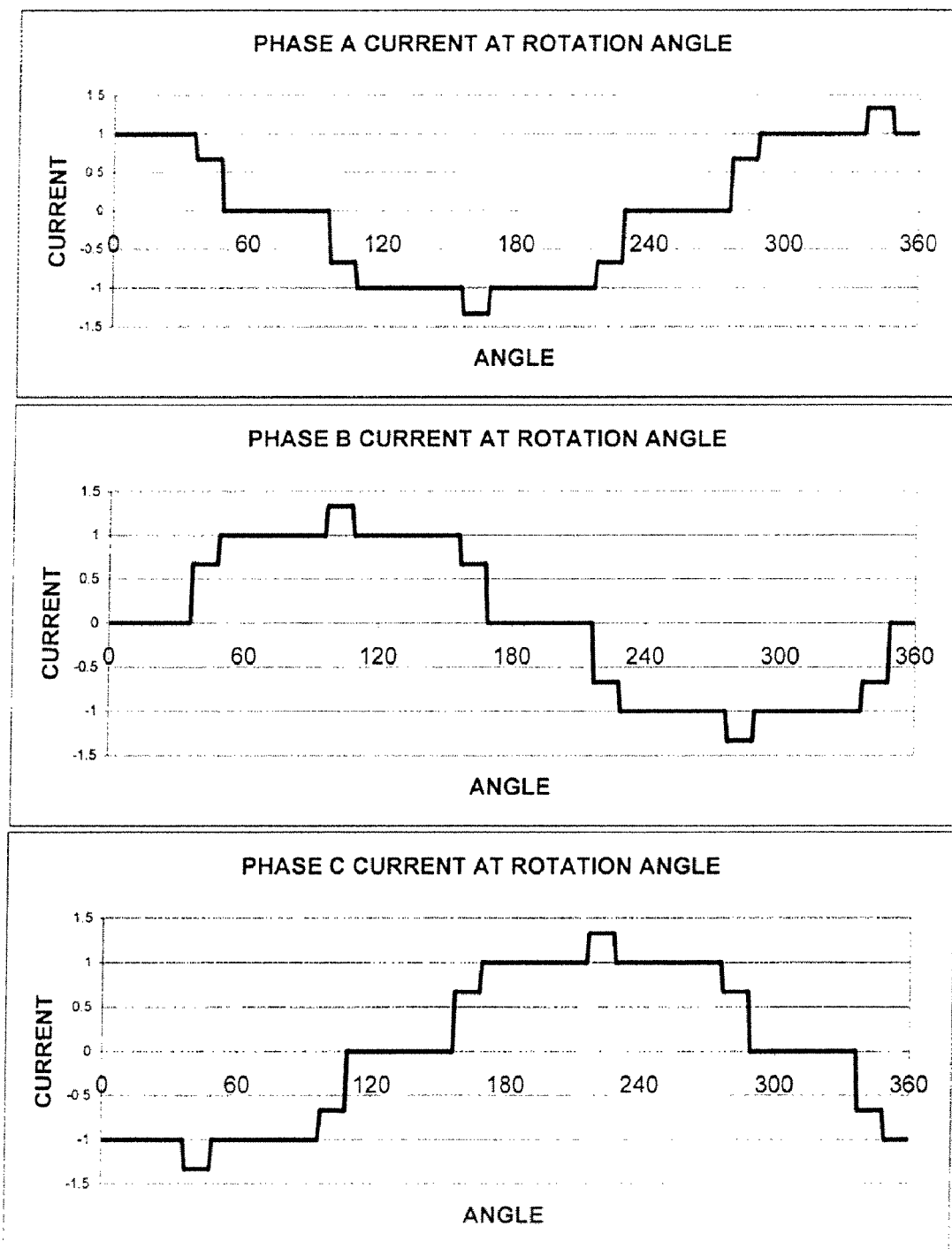
FIG. 10 illustrates exemplary current waveforms generated by a commutator of FIG. 9, according to an embodiment of the invention.

FIG. 10 illustrates exemplary current waveforms generated by commutator 900 of FIG. 9, according to an embodiment of the invention. FIG. 10 shows approximate values of the current in the three individual coils. By way of example, consider that when the three brushes are at what is shown as the 0-degree angle in the charts, current is flowing into coil A from the brush connected to coil A and out of coil C. As such, brush B is in a no contact state. As commutator 900 rotates, it reaches about 35 degrees when brush B makes contact with coil B. Current is applied to coil B as current to coil A decreases. At the same time, current to coil C also increases. At about a 50-degree rotation angle, the contact by brush A with coil A is broken so the coil current in coil A decreases to zero while the current in coil B increases and the current flows out of coil C. This process repeats for each coil in turn as commutator 900 goes around. Note that this diagram (as well as FIG. 12) omits effects for slower current rise times due to, for example, coil inductance and resistance.

Figure 11:
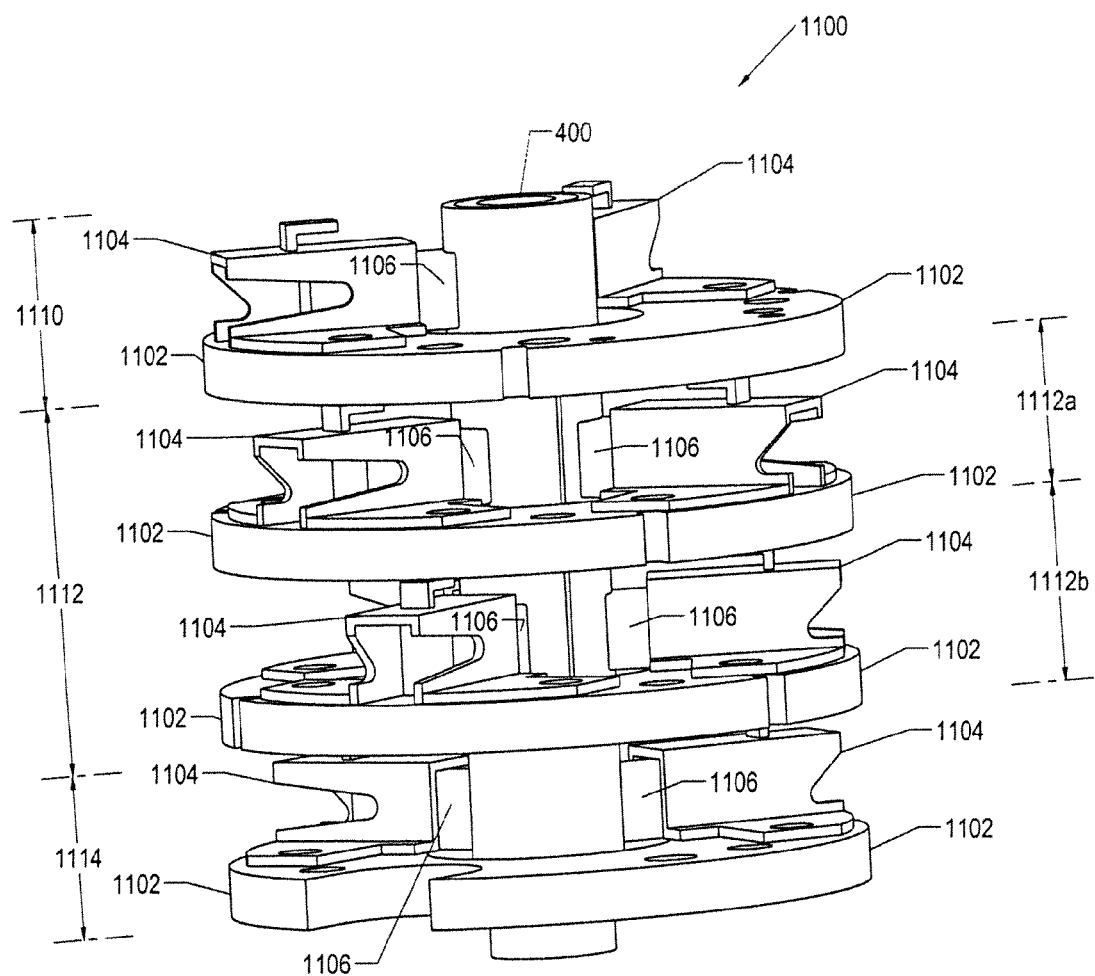
FIG. 11 depicts yet another example of a field pole commutator including brushes, according to one or more embodiments of the invention.

FIG. 11 depicts yet another example of a field pole commutator including brushes, according to one or more embodiments of the invention. Field pole commutator 1100 includes field pole commutator 400 and brush holder supports 1102, each of which are configured to be affixed in space such that they remain stationary with respect to the power transfer region, the first power region and the second power region. Field pole commutator 1100 also includes brush holders 1104 coupled to one or more of plurality of brush holder supports 1102. It further includes brushes 1106, each being mounted so they can slide in an associated brush holder 1104. In one embodiment, field pole commutator 1100 includes a first set 1110 of one or more brushes 1106 configured to electrically engage a first power region and a second set 1114 of one or more brushes 1106 configured to electrically engage a second power region. Field pole commutator 1100 also includes a set 1112 of one or more brushes 1106 configured to electrically engage the power transfer region.

In the example shown, first set 1110 and second set 1114 each include two brushes 1106, whereas set 1112 includes six brushes 1106. The six brushes 1106 of set 1112 can be associated with the six individual coils wrapped on field poles A, B and C so that each field pole has two separate coils which are wound for implementing a motor described herein. Set 1112 of one or more brushes includes two subsets: subset 1112a and subset 1112b. Subset 1112a include three brushes 1106 for the three coils that are offset from the brushes of subset 1112b to provide a finer resolution of current steps on each field pole. The leading brush makes contact first and the current increases in the coil connected to this brush and then the second brush makes contact, adding the current in its coil to the total field pole effective current. After the preset current on time set by the commutation width, the current is broken in the first coil and then later broken in the second coil.

Figure 12:
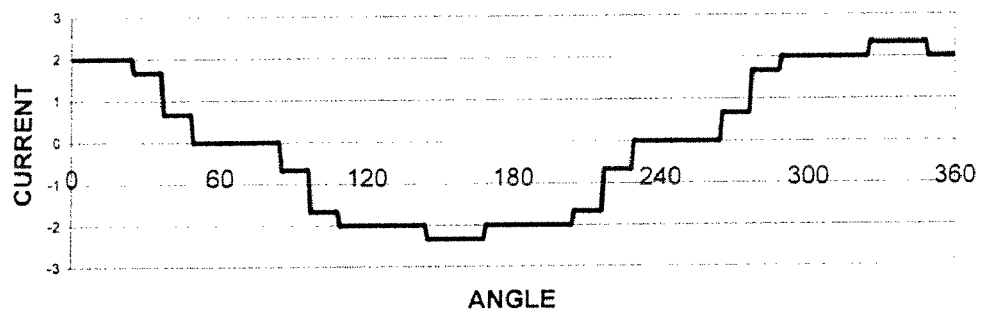
FIG. 12 illustrates exemplary current waveforms generated by a commutator of FIG. 11, according to an embodiment of the invention.
Figure 12:
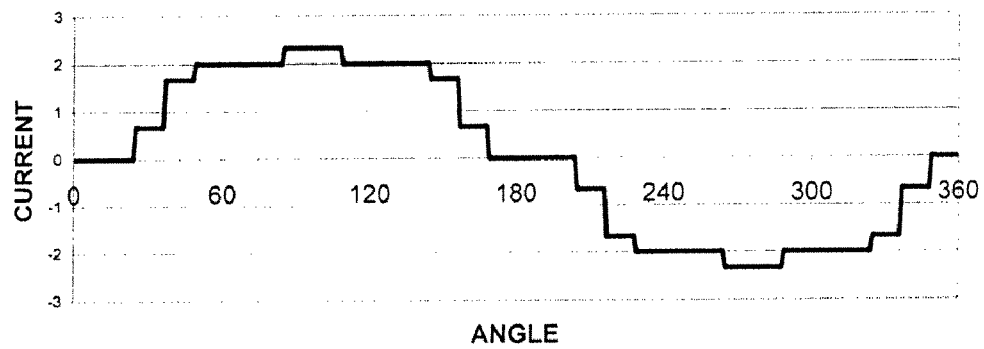
Figure 12:
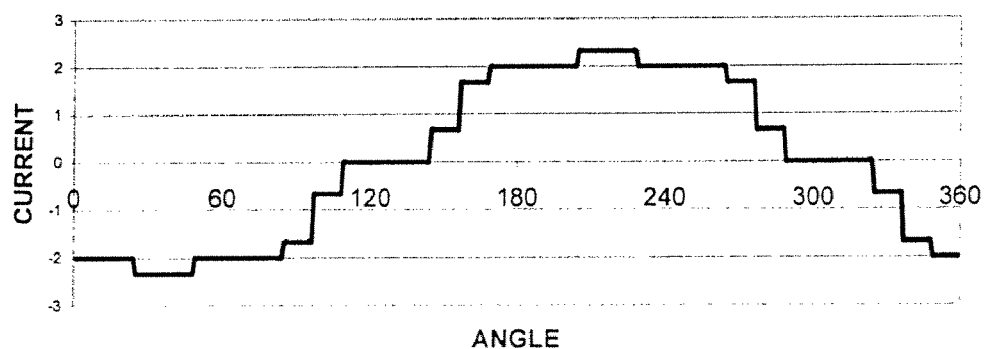

FIG. 12 illustrates exemplary current waveforms generated by commutator 1100 of FIG. 11, according to an embodiment of the invention. FIG. 12 shows approximate values of the total effective current in the individual field poles which are the sum of the individual coil currents. This illustrates the use of two subsets of three brushes to further form current waveforms approximating sinusoidal waveforms.

Figure 13:
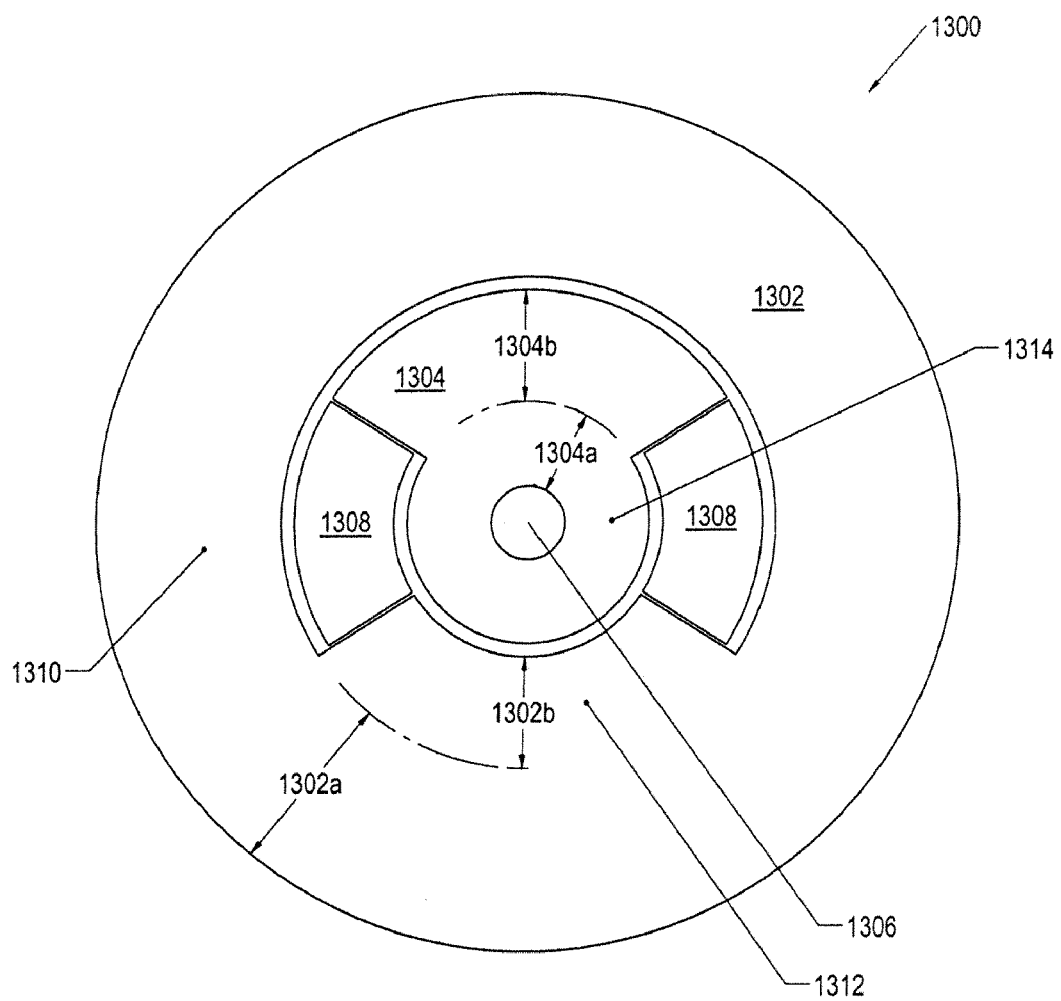
FIG. 13 illustrates an example of another field pole commutator for commutating brushless rotor-stator structures, according to one or more embodiments of the invention.

FIG. 13 illustrates an example of another field pole commutator for commutating brushless rotor-stator structures, according to one or more embodiments of the invention. Field pole commutator 1300 is an axial disk configured to selectably direct power signals to coils of active field pole members (not shown). Field pole commutator 1300 includes a power transfer region 1312 configured to transfer power signals, such as a first power signal and second power signal, to the coils of active field pole members. Field pole commutator 1300 also includes power regions, such as power region 1310 and power region 1314. In particular, power region 1310 and power region 1314 are configured to respectively receive the first power signal and the second power signal from external power sources (not shown). For example, the external power sources can include power supplies that generate positive voltages, or +V (e.g., as the first power signal) and negative voltages, or −V (e.g., as the second power signal). Then, power region 1310 and power region 1314 provide the first power signal and the second power signal, respectively, to power transfer region 1312. Generally, power region 1310 and power region 1314 each are configured to rotate together with power transfer region 1312 about an axis of rotation 1306. In at least one embodiment, power regions 1310 and 1314 include conductively flat surfaces for providing power signals continuously to power transfer region 1312. As such, power signals can be applied to commutator 1300 in a continuous manner. In a specific embodiment, field pole commutator 1300 is configured to reside on a rotor of a brushless rotor-stator structure, with the stator including stationary active field pole members.

Power transfer region 1312 is configured to transfer power signals received from the external power sources via first surface portions 1302a and 1304a to coils of active field pole members. First surface portions 1302a and 1304a respectively convey power signals to second surface portions 1302b and 1304b. Each second surface portion 1302b and 1304b of power transfer region 1312 covers a limited angle of rotation. Non-conductive regions 1308 are included to interrupt current transfer to one or more coils. Note that first surface portion 1302a and second surface portion 1302b constitute first field pole commutator member 1302 and first surface portion 1304a and second surface portion 1304b constitute second field pole commutator member 1304. First field pole commutator member 1302 and second field pole commutator member 1304 are electrically isolated from each other.

Figure 14:
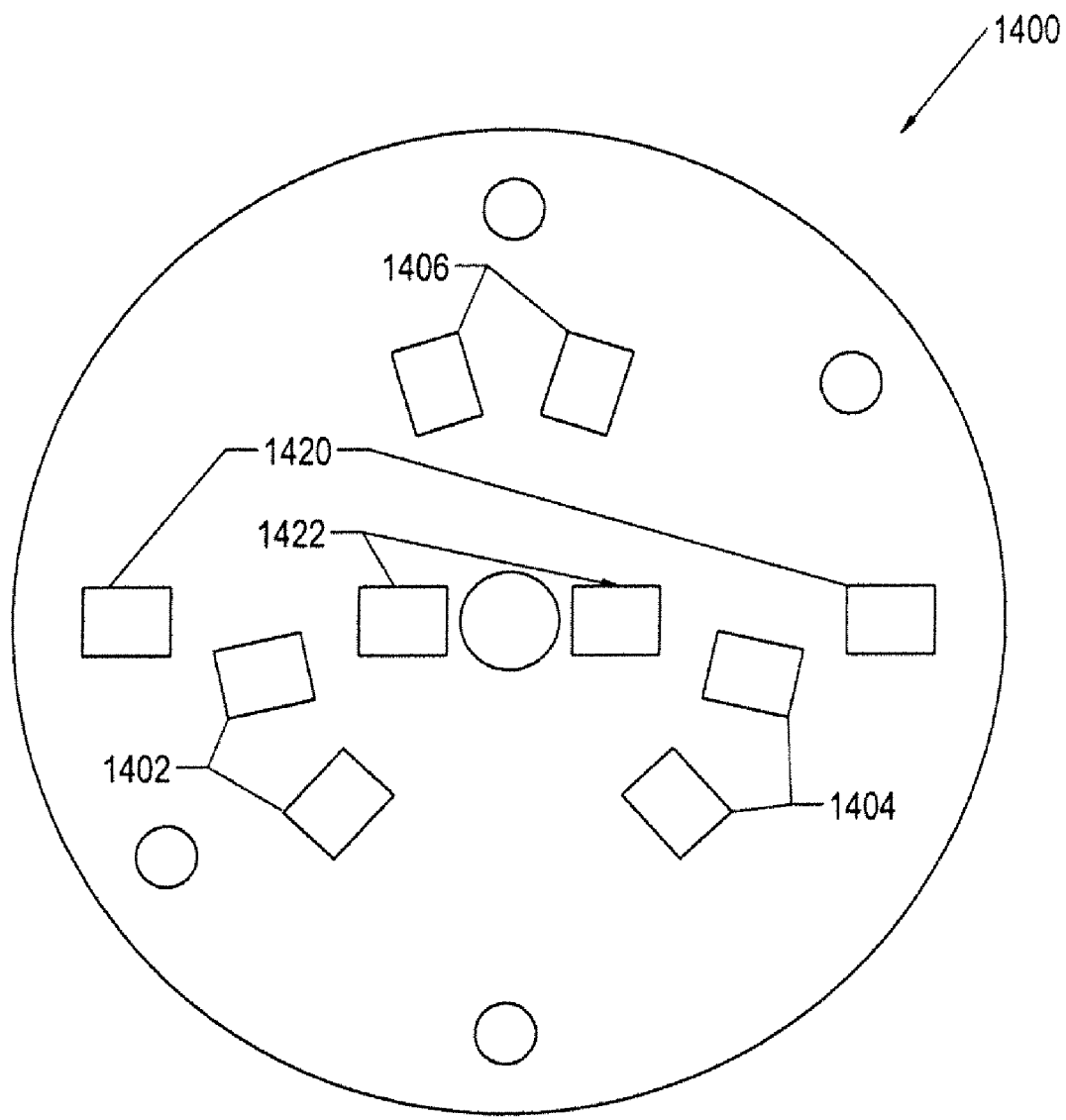
FIG. 14 illustrates an example of a brush holder for facilitating contact between brushes and an axial disk commutation of FIG. 13, according to a specific embodiment of the invention.

FIG. 14 illustrates an example of a brush holder for facilitating contact between brushes and an axial disk commutation of FIG. 13, according to a specific embodiment of the invention. As shown, axial disk brush holder 1400 depicts locations of brushes for connecting power signals to coils for phases A, B, and C via respective brushes "phase A" brushes 1402, "phase B" brushes 1404, and "phase C" brushes 1406. Power is supplied via power brushes 1420 and 1422 to power regions 1310 and 1314 of FIG. 13. More or fewer brushes can be implemented.

A practitioner of ordinary skill in the art requires no additional explanation in making and using the embodiments of the rotor-stator structure described herein but may nevertheless find some helpful guidance by examining the following references in order from most to least preferred: "IEEE 100: The Authoritative Dictionary of IEEE Standard Terms," Institute of Electrical and Electronics Engineers (Kim Breitfelder and Don Messina, eds., 7th ed. 2000), "General Motor Terminology," as defined by the Small Motors and Motion Association ("SMMA"), and "Standard Specifications for Permanent Magnet Materials: Magnetic Materials Producers Association ("MMPA") Standard No. 0100-00," International Magnetics Association.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment may readily be interchanged with other embodiments. For example, although the above description of the embodiments related to a motor, the discussion is applicable to all electrodynamic machines, such as a generator. As another example, while axial disk and cylindrical commutators are described herein, other equivalent types of commutators are within the scope of the invention.

Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. It is intended that the following claims and their equivalents define the scope of the invention.

The invention claimed is:

1. A field pole commutator for selectably directing power signals to coils of active field pole members, comprising:
    a power transfer region configured to transfer a first power signal and a second power signal to said coils; and
    a first power region and a second power region configured to provide said first power signal and said second power signal, respectively, to said power transfer region, said first power region and said second power region each being configured to rotate together with said power transfer region about an axis of rotation;
    wherein said power transfer region, said first power region and said second power region rotate in synchronicity with a rotor including magnets with a configuration selected from a conical configuration and a cylindrical configuration.

2. The field pole commutator of claim 1 wherein said field pole commutator is configured to reside on a rotor of a brushless motor.

3. The field pole commutator of claim 2 wherein said brushless motor comprises:
    a stator including said coils and said active field pole members, both of which are stationary.

4. The field pole commutator of claim 1 further comprising:
    a first field pole commutator member within said first power region, including:
        a first surface portion having a circular cross-section in a plane perpendicular to said axis of rotation along a first axial length, and
        a second surface portion having an arc-shaped cross section in a plane perpendicular to said axis of rotation along a second axial length; and
    a second field pole commutator member within said second power region, including:
        a first surface portion having a circular cross-section in a plane perpendicular to said axis of rotation along a third axial length, and
        a second surface portion having an arc-shaped cross section in a plane perpendicular to said axis of rotation along said second axial length.

5. The field pole commutator of claim 4 further comprising a non-conductive cylinder having an inner diameter and an outer diameter, said inner diameter being configured to reside on a shaft of said rotor and said outer diameter being configured to contact an inner diameter of said first surface portions and said second surface portions.

6. The field pole commutator of claim 4 wherein
    said first surface portion of said first field pole commutator portion constitutes said first power region,
    said first surface portion of said second field pole commutator portion constitutes said second power region, and
    said second surfaces of said first field pole commutator and said second field pole commutator constitute at least one or more portions of said power transfer region,
    wherein said second surfaces are electrically isolated from each other.

7. The field pole commutator of claim 6 wherein the temporal application of said first power signal and said second power signal to said coils is a function of the lengths of said arc-shaped cross sections.

8. The field pole commutator of claim 6 wherein the temporal application of said first power signal and said second power signal to said coils is a function of the positioning about said axis of rotation of said arc-shaped cross sections.

9. The field pole commutator of claim 1 wherein said active field pole members have one or more coils wound about the periphery of field pole members to form said active field pole members.

10. The field pole commutator of claim 1 further comprising:
    a plurality of brush holder supports configured to be affixed such that they remain stationary with respect to said power transfer region, said first power region and said second power region;
    one or more brush holders coupled to one or more of said plurality of brush holder supports; and
    one or more brushes mounted in said one or more brush holders.

11. The field pole commutator of claim 10 further comprising:
    a first set of one or more brushes configured to electrically engage said first power region;
    a second set of one or more brushes configured to electrically engage said second power region; and
    a number of other sets of one or more brushes configured to electrically engage said power transfer region.

12. The field pole commutator of claim 11 wherein each of said number of other sets of one or more brushes resides at different angular positions from a reference ray extending radially in a plane perpendicular to said axis of rotation, thereby producing different times at which each of said coils are excited.

13. The field pole commutator of claim 11 wherein first set of one or more brushes and second set of one or more brushes provide a positive direct current ("DC") current and a negative DC current, respectively, to said first power region and said second power region.

* * * * *